US007035913B2

(12) United States Patent
Culp et al.

(10) Patent No.: US 7,035,913 B2
(45) Date of Patent: Apr. 25, 2006

(54) SYSTEM FOR COLLECTION AND DISTRIBUTION OF CALENDAR INFORMATION

(75) Inventors: Jerlyn R Culp, Fort Collins, CO (US); K Douglas Gennetten, Ft Collins, CO (US); Michelle R. Lehmeier, Loveland, CO (US); Michael L Rudd, Fort Collins, CO (US); Steven L Webb, Loveland, CO (US); Brian J. Brown, Fort Collins, CO (US); Steven T. Breidenbach, San Diego, CA (US); James C Albritton-McDonald, Bellvue, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 711 days.

(21) Appl. No.: 09/966,281

(22) Filed: Sep. 28, 2001

(65) Prior Publication Data

US 2003/0065742 A1 Apr. 3, 2003

(51) Int. Cl.
*G06F 15/16* (2006.01)
*G06F 17/60* (2006.01)
(52) U.S. Cl. ............... 709/218; 709/217; 709/219; 705/9
(58) Field of Classification Search ............ 705/8–9; 709/218–219, 223–224; 715/500.1, 963; 283/2; 719/318; 358/442, 474
See application file for complete search history.

(56) References Cited

U.S. PATENT DOCUMENTS

| 3,018,343 | A | * | 1/1962 | Grostick ............... 200/61.21 |
| 5,761,525 | A | * | 6/1998 | Williams ............... 715/500.1 |
| 5,960,406 | A | * | 9/1999 | Rasansky et al. ............. 705/9 |
| 6,018,343 | A |   | 1/2000 | Wang et al. |
| 6,018,393 | A | * | 1/2000 | Takishima et al. ......... 356/511 |
| 6,064,977 | A |   | 5/2000 | Haverstock et al. |
| 6,085,166 | A | * | 7/2000 | Beckhardt et al. ........... 705/9 |
| 6,101,480 | A | * | 8/2000 | Conmy et al. ............... 705/9 |
| 2002/0075524 | A1 |   | 6/2002 | Blair et al. |
| 2002/0093540 | A1 |   | 7/2002 | Mariani et al. |
| 2003/0004776 | A1 |   | 1/2003 | Perella et al. |

FOREIGN PATENT DOCUMENTS

| EP | 1014286 A2 | 6/2000 |
| EP | 1074930 A2 | 7/2001 |
| WO | WO00/62201 A1 | 10/2000 |
| WO | WO02/44977 A1 | 6/2002 |
| WO | WO02065359 A1 | 8/2002 |

OTHER PUBLICATIONS

Internet article entitled "vCard Overview" pp. 1-3, dated May 23, 2001; http://www.imc.org/pdi/vcardoverview.html.
Internet article entitled vCard and vCalendar, pp. 1-2, dated May 23, 2001; http://www.imc.org/pdi/.
Internet article entitled Internet Mail Consortium, pp. 1-4, dated May 23, 2001; http://www.imc.org/.

* cited by examiner

*Primary Examiner*—Saleh Najjar
*Assistant Examiner*—Asad Muhammed Nawaz

(57) ABSTRACT

The present invention provides a system for obtaining and distributing calendar information from one or more calendar sources, as may be defined by a user, in a manner that allows for easy incorporation of the obtained calendar information into a personal or group calendar database. A collection and distribution unit is provided for obtaining calendar information from a predetermined calendar source. If necessary, the collection and distribution unit may convert the obtained calendar information into a predetermined format. Calendar data is distributed by the collection and distribution unit in accordance with preferences specified by a subscriber record.

19 Claims, 7 Drawing Sheets

SYSTEM FOR COLLECTION AND DISTRIBUTION OF CALENDAR INFORMATION

CROSS-REFERENCE TO RELATED APPLICATIONS

This application is related to co-pending U.S. utility patent application entitled "ELECTRONIC CALENDARING DEVICE", filed concurrently herewith on Sep. 28, 2001, having been granted Ser. No. 09/966,122, which is entirely incorporated herein by reference.

TECHNICAL FIELD

The present invention is generally related to a system for collecting calendar data from one or more calendar sources. Calendar data is converted into a predetermined format and then distributed to a subscriber.

BACKGROUND OF THE INVENTION

The popularity of electronic calendaring devices such as personal digital assistants (PDAs), electronic organizers, or calendar and scheduling software applications, such as Microsoft® Outlook®, run on typical personal computers has increased significantly in recent times. These devices allow a user to maintain a current full contact database, as well as calendar and scheduling information in a convenient and portable format. While many people are making use of these electronic calendaring devices and applications, not everyone has moved from the more conventional paper based calendar system. Further, while many people are users of electronic calendaring devices, many of these same people also maintain a separate paper based calendar in addition to an electronic calendaring device. Maintaining both paper based and electronic calendaring devices so as to keep information up-to-date and in sync on both calendar systems can be a time consuming and not so straightforward undertaking.

While many electronic calendaring devices are available and in wide use, there is no standard format for creating or distributing calendar information that is commonly used by known electronic calendaring devices. In view of this, it is difficult to share calendar information between users of different types of calendaring devices. This makes the task of synchronizing calendars a more complicated task.

Calendar information is generated by many parties or organizations. For example, the local baseball team may generate a calendar setting out the schedule of all games to be played for the season. The local art museum may generate a calendar setting out scheduled shows and exhibits for the year. Additionally, the local elementary school may generate a calendar setting out scheduled events such as school plays, sporting events, distribution of report cards or school holidays for the school year. This calendar information may be distributed in written format embodied on a print medium such as, for example, paper, by each party or organization. Alternatively, this information may be published to a site on the world wide web (WWW) in, for example, hyper-text mark up language (HTML) format or as a downloadable portable document file (.PDF).

In order to incorporate calendar information set out in written format or published in electronic format, a user of an electronic calendaring device must typically manually enter the data into his/her respective electronic calendaring device in order for it to be reflected on her/his personal calendar/ schedule. This can be time consuming. Further, errors may be introduced by a user while entering the calendar data into his/her electronic calendaring device.

Thus, a heretofore unaddressed need exists in the industry to address the aforementioned deficiencies and inadequacies.

SUMMARY OF THE INVENTION

The present invention provides a system for collecting and distributing calendar information. Briefly described, in architecture, the system can be implemented as follows. A network interface is provided for connecting to a network. Further, storage memory is provided for storing a subscriber list. A controller is provided and configured to access a calendar of interest via the network interface and distribute calendar data to a subscriber in accordance with the subscriber list.

The present invention can also be viewed as providing a method for collecting and distributing calendar information. In this regard, the method can be broadly summarized by the following steps: a calendar of interest identified by a subscriber list is accessed. Calendar data from the calendar of interest is retrieved. The calendar data is converted into calendar data of a predetermined format in accordance with the subscriber list. The converted calendar data is transferred to the subscriber via delivery options specified by the subscriber list.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

The present invention provides a system for obtaining and distributing calendar information from one or more calendar sources, as may be defined by a user, in a manner that allows for easy incorporation of the obtained calendar information into a personal or group calendar database. The obtained calendar information may be converted into a standard format, for example, a format native to a particular subscriber unit or calendar database prior to distribution. The information may be selectively or fully processed to, for example, sort or otherwise organize the calendar information so as to place it into a desired format for distribution to a user. The format for distribution is preferably a format that allows for easy or direct incorporation of the calendar information into a calendar database associated with the user. The present invention allows for easy incorporation of printed calendar information, as well as electronic format calendar information, into a predefined calendar database.

Figure 1:
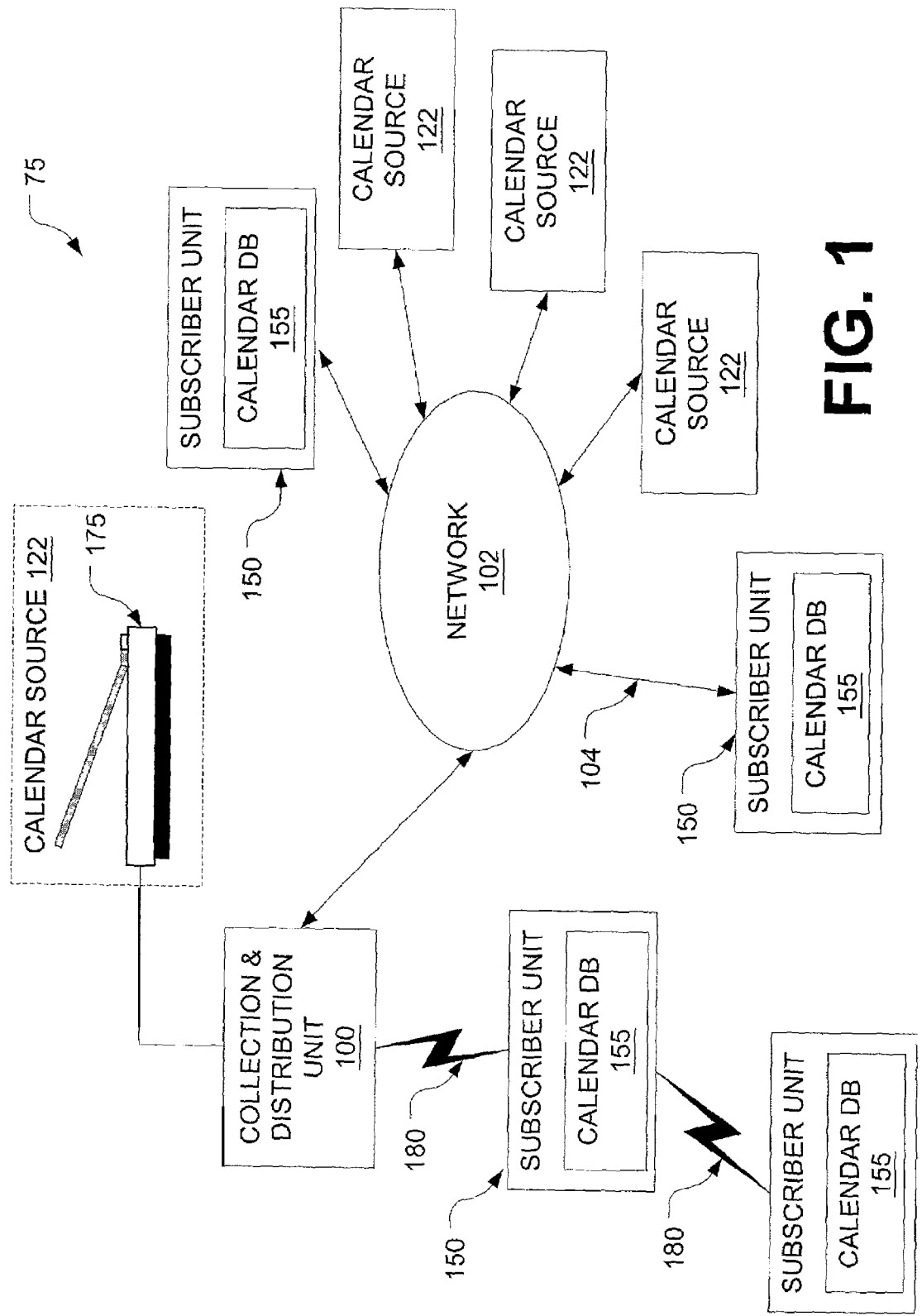
FIG. 1 is a block diagram illustrating a calendar data collection and distribution system.

FIG. 1 is a block diagram illustrating a system 75 for collection and distribution of calendar information. In this system, a collection and distribution unit 100 is provided. Collection and distribution unit 100 includes an interface for connecting to a network 102. One or more calendar sources 122 may be connected and/or accessible to collection and distribution unit 100 via the network 102. Further, collection and distribution unit 100 may be configured to receive input directly from one or more calendar sources 122. A subscriber interface 180 is provided for transferring information between the collection and distribution unit 100 and a subscriber unit 150.

Subscriber unit 150 may be associated with a particular user. A user may be, for example, a single user, a group of users or an organization. The subscriber unit 150 provides a means for a user to maintain, update and review calendar and scheduling information of interest.

Subscriber unit 150 may include a calendar database 155 that is preferably associated with the subscriber unit 150. Calendar database 155 may also be associated with a particular user to which the subscriber unit 150 may also be associated. Calendar database 155 may be composed of calendar/scheduling information which reflects the personal schedule of the user as well as, perhaps, the calendar and scheduling information of events, other parties or organizations that are of interest to the user of the subscriber station 150. The calendar database 155 will preferably be stored in a format native to the subscriber unit 150 (native format). However, subscriber unit may be alternatively configured to carry out conversion of the calendar database 155 to/from the native format when the calendar database is accessed to retrieve or store data. It will be recognized that the native format of each subscriber unit need not be the same for all. However, provisions for converting the data from the various native formats will be required. These provisions may be incorporated into the collection and distribution unit 100. Similarly, each subscriber unit may be configured to provide for conversion of data from the native format into a second format for exchange with, for example, the collection and distribution unit 100 or another subscriber unit 150.

Collection and distribution unit 100 may also be configured to exchange information with a subscriber unit 150 via the network 102. Subscriber interface 180 may be a wireless interface such as, for example, an infrared or radio frequency (RF) compliant interface. It may also be a Code Division Multiple Access (CDMA), Time Division Multiple Access (TDMA) or Global System for Mobile Communications (GSM) compliant wireless interface. Subscriber interface 180 may also be a wired interface.

Figure 2:
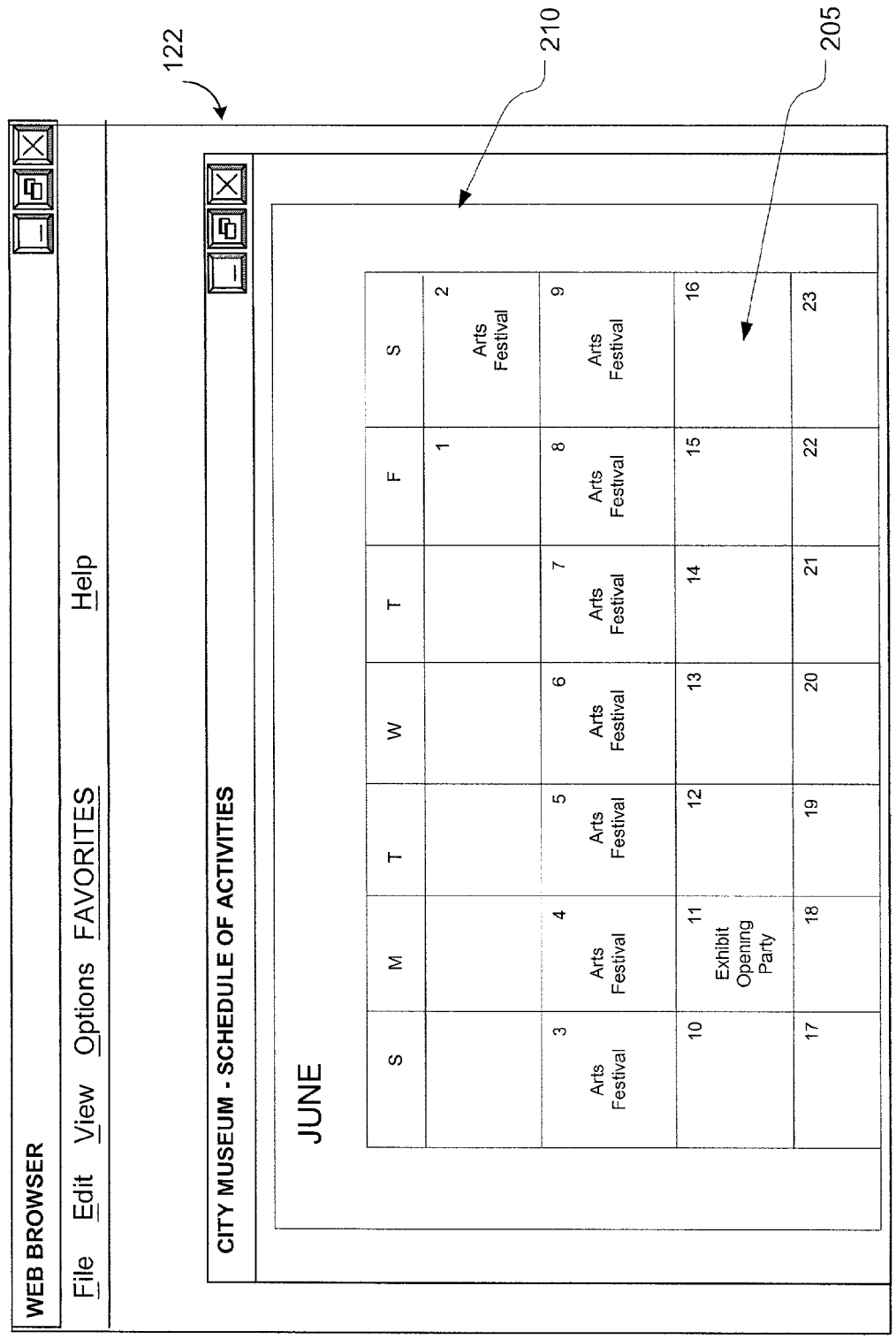
FIG. 2 is a diagram illustrating an example of a calendar source composed of a web site at which calendar information is published.

A calendar source 122 may be, for example, a web site accessible via the network 102. FIG. 2 shows an illustration depicting a calendar source 122 that presents calendar information 205 via a web site 210. It may also be a data file stored on, for example, a data file server or other memory storage device. The data file server or other memory storage device may be accessible via a local area network (LAN), wide area network (WAN), or the Internet. Calendar source 122 may also be an e-mail message, with or without attachments, for example, received from a predetermined source or which is identified as pertaining to a predetermined subject, party, organization or group. Further, calendar source 122 may be an optical imaging device 175. The optical imaging device 175 may be associated with the collection and distribution unit 100. Optical imaging device 175 may be, for example, but not limited to, an optical scanning device such as a flatbed or photographic film scanner. Optical imaging device 175 may also be, for example, a charge coupled device (CCD) imager or a complimentary metal oxide semiconductor (CMOS) imager, digital still camera or video camera.

Figure 4A:
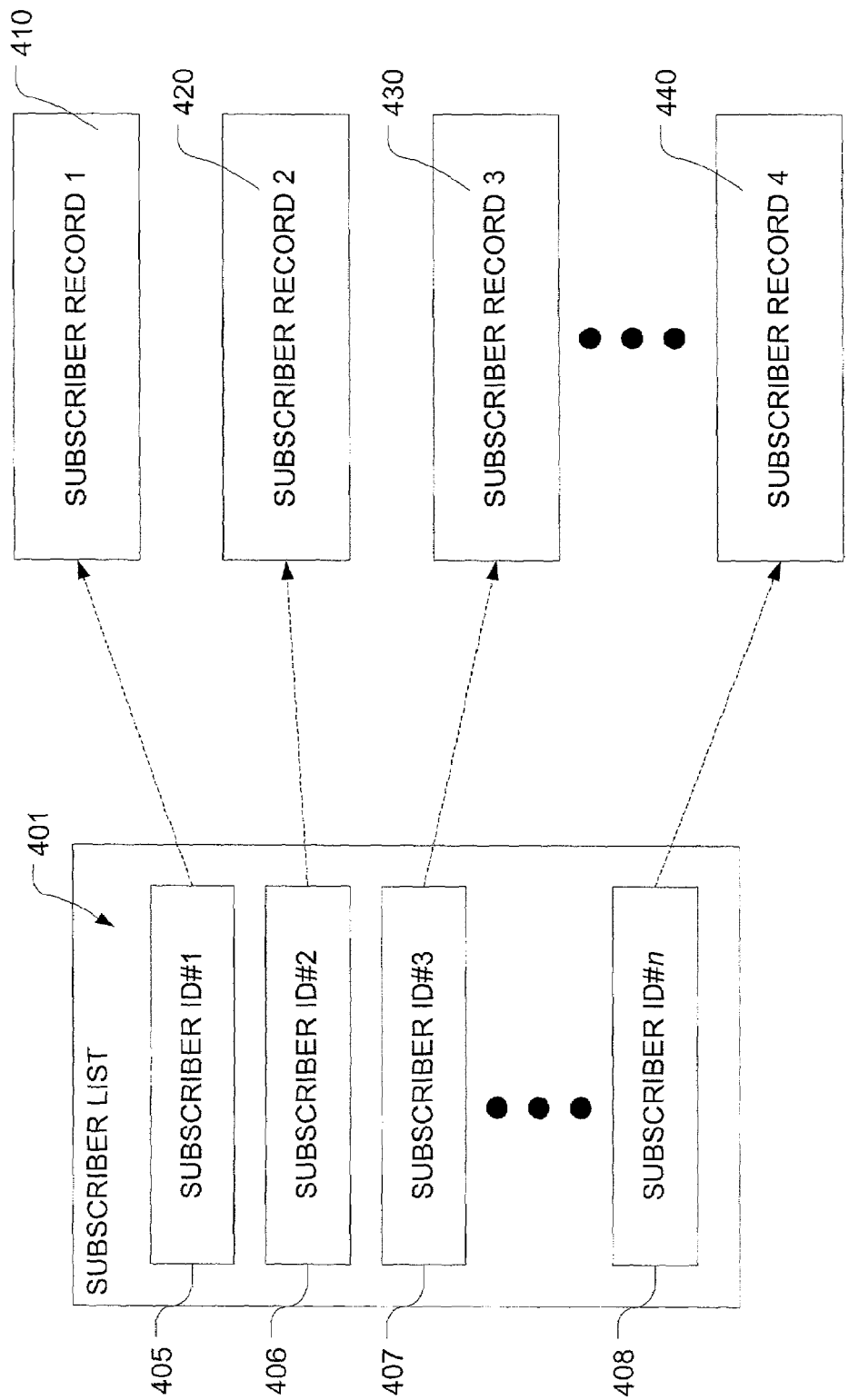
FIG. 4A is a drawing illustrating a subscriber list and subscriber records.

In a preferred embodiment, a user associated with a subscriber station 150 subscribes for the service of collection and distribution of calendar information (the service) from a specified calendar source 122, as defined by the user at, for example, the time of subscribing for the service. At the time of subscribing, a subscriber record (FIG. 4) is established and stored to memory for future reference. This subscriber record sets out the various preferences for distribution and collection of calendar information.

Figure 3:
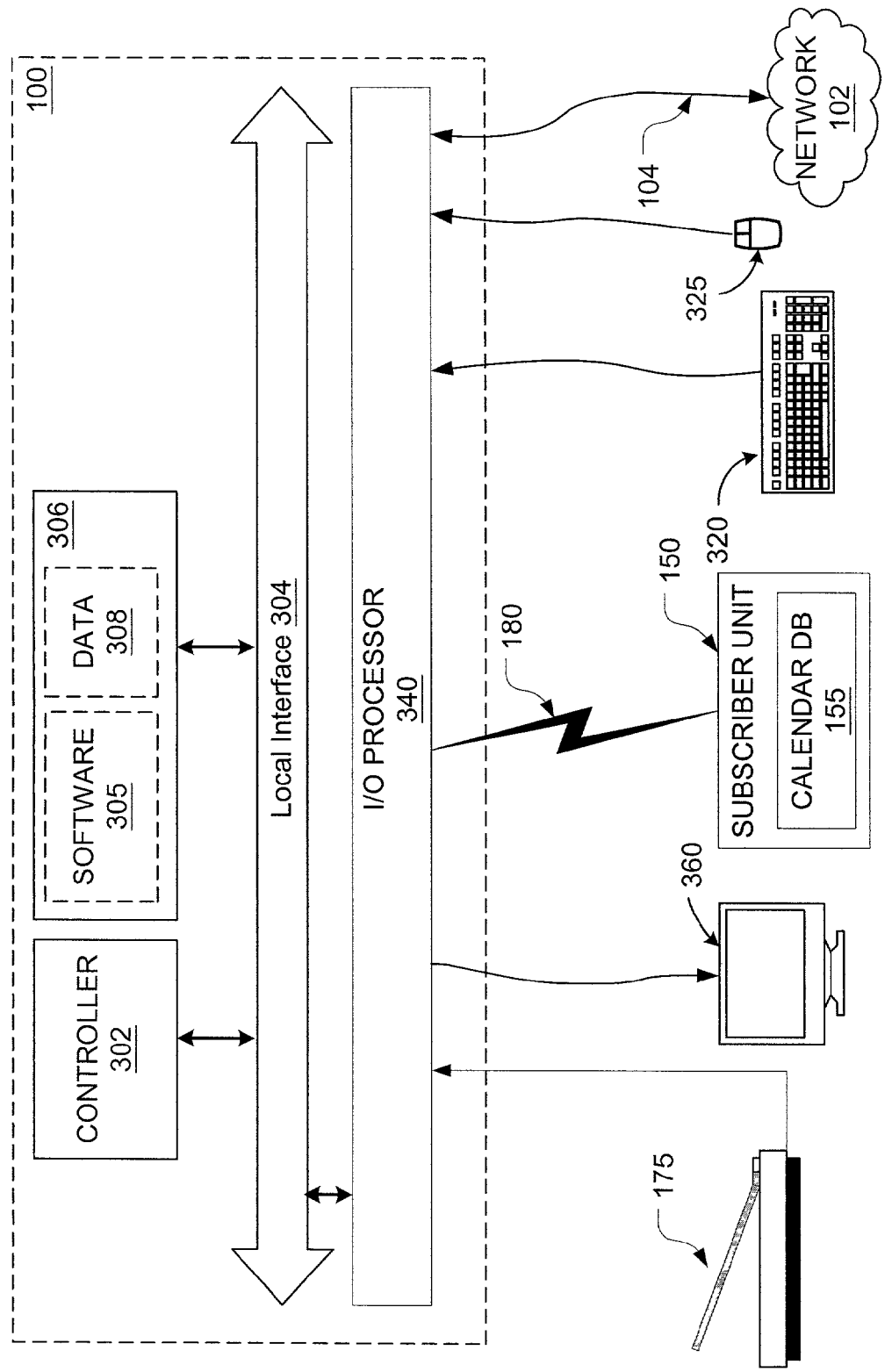
FIG. 3 is a block diagram of a collection and distribution unit 100.

FIG. 3 shows a detailed description of collection and distribution unit 100. Collection and distribution unit 100 includes a controller 302 and memory storage 306. Memory storage 306 may include memory for storing software 305 as well as data 308. Software 305 may include operational software for causing the various functions and operations of the collection and distribution unit 100 to be carried out. A local interface 304 is provided for transferring instructions and data between controller 302 and memory 306. Local interface 304 provides a conduit for transfer of electronic instructions and data from/to the input/output (I/O) processor 340. A subscriber interface 180 is provided for transferring data between a subscriber unit 150 and the collection and distribution unit 100. Further, I/O processor 340 includes provisions for receiving data from, for example, an optical imaging device 175 as well as keyboard 320 and pointing device 325. I/O processor 340 also includes an interface 104 for connecting the collection and distribution unit 100 to a network 102.

Processing of calendar information obtained from a calendar source 122 may include conversion of calendar data to the native format of the calendar database 155 associated with a subscriber unit 150. In one embodiment, calendar information may be obtained from a calendar source 122 in any one of a number of available data formats, including, but not limited to, hyper-text mark up language (HTML), extensible mark up language (XML), graphics interchange format (.gif), tagged image file format (.tiff), joint photographic experts group image format (.jpeg or .jpg) or portable document file format (.pdf). In one embodiment, calendar information may be obtained from a calendar source 122 in hyper-text mark up language (html) format and converted into the native format of calendar database 155, for example a vCard or vCalendar compliant format. Processing of obtained calendar data may also include conversion of obtained calendar data into an editable text format via, for example, optical character recognition (OCR). Specifications for the vCard format are disclosed in Internet Engineering Task Force (IETF) publications RFC 2425 and RFC 2426, the disclosures of which are incorporated herein by reference. Further, the specifications for the vCalendar are disclosed in Internet Engineering Task Force (IETF) publications RFC 2445, RFC 2446 and RFC 2447, the disclosures of which are incorporated herein by reference.

Collection and distribution unit 100 is preferably configured to obtain calendar information from a predetermined calendar source, or sources, 122. Calendar information may be obtained via retrieving data from a calendar source 122 or alternatively via receiving calendar information transmitted from a calendar source 122 or alternatively from a subscriber unit 150.

The collection and distribution unit 100 is also configured to distribute the calendar information to a subscriber unit 150 via the network 102 or via subscriber interface 180. In this embodiment, the subscriber unit 150 is registered with collection and distribution unit 100 for the collection and distribution of calendar information of interest to the subscriber unit 150, from a specified calendar source.

Registration of the subscriber unit 150 may be carried out at the time the user initiates, or subscribes for, the service. At this time, and with reference to FIG. 4A, the new subscriber may be added to a subscriber list 401 that is stored on memory associated with the collection and distribution unit 100. The subscriber list 401 includes one or more entries (405–408) identifying subscribers to the service. For each subscriber ID (405–408) in the subscriber list 401, a corresponding subscriber record (410–440) is created. The subscriber record will preferably set out the various preferences of the user with regard to collection and distribution of calendar information.

Figure 4B:
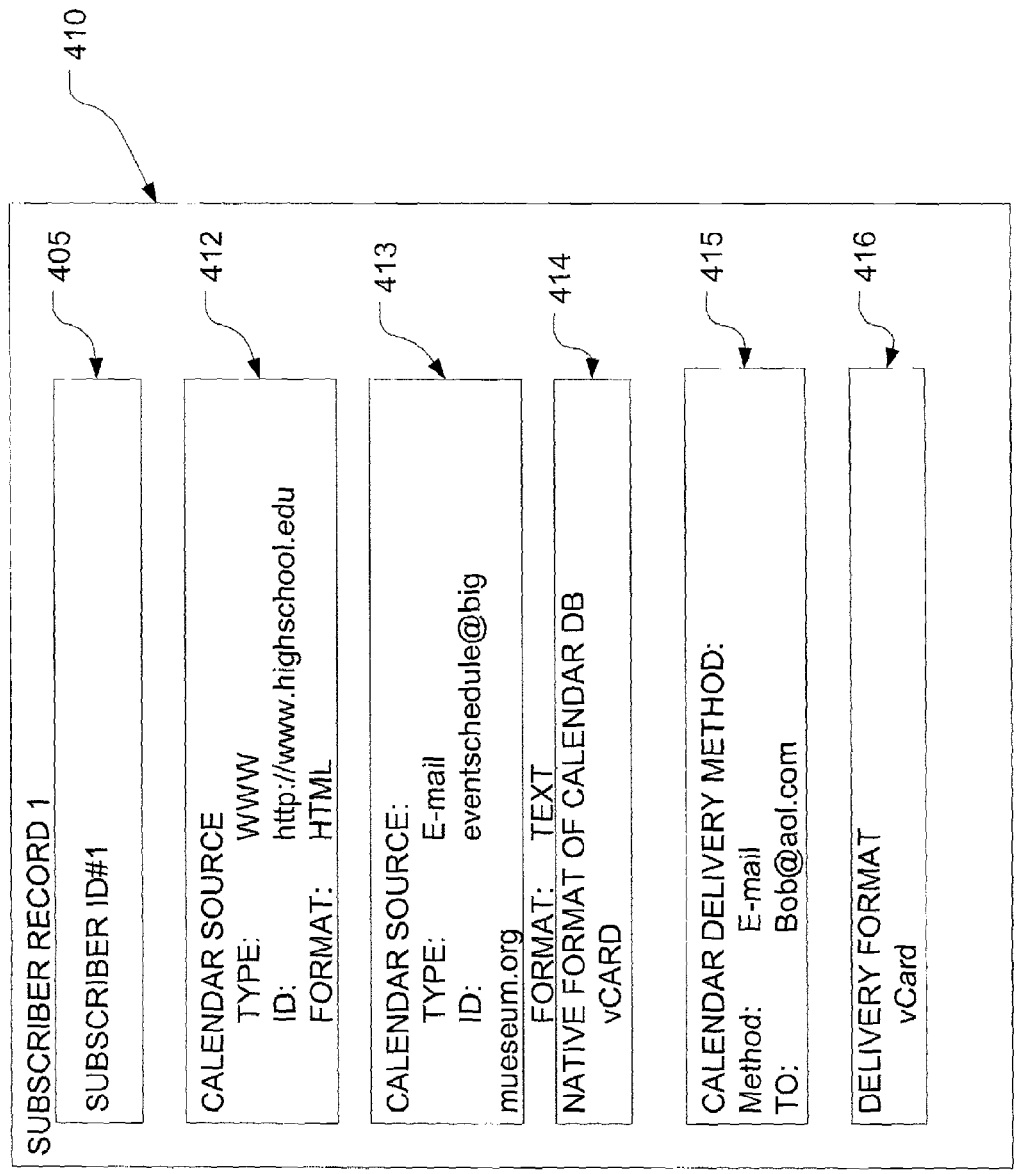
FIG. 4B is a drawing illustrating a subscriber record.

With reference to FIG. 4B, subscriber record 410 will be discussed. The subscriber ID 405 corresponds to a subscriber record 410 created for the new subscriber.

In this example, the subscriber record 410 may include an entry 405 that identifies the subscriber ID that which the subscriber record 410 is associated. Calendar source entries 412 and 413 are provided that identify a calendar source from which calendar information is desired. These entries specify information pertaining to the specified calendar source. For example, entry 412 indicates that the calendar source is a web site. The address of the web site indicates that the format of calendar information from this source is in HTML format.

The subscriber record 410 may also include an entry 414 specifying the native format of the calendar database associated with the subscriber unit associated with the subscriber/user. In this example, the format specified is the vCard format. Entry 415 specifies the method of delivery of calendar data to a subscriber unit. In this example, the calendar data will be distributed to the subscriber via e-mail to a specified e-mail address. As the format of data to be distributed by the collection and distribution unit does not necessarily have to be the same as the native format of the calendar database 155 of the subscriber unit 150 associated with the subscriber, an entry 416 is provided to indicate the data format that calendar should be distributed in. In this case, the data format is the same as the native format specified in entry 414.

In one embodiment, subscriber list 401 is stored to a memory storage device associated with the collection and distribution unit 100 (FIG. 3). This memory storage device may be, for example, memory storage 306 (FIG. 3) or another storage device external to the collection and data distribution unit 100. When a subscriber unit 150 is registered with the collection and distribution unit 100, a subscriber record is created and stored to memory storage associated with the collection and distribution unit 100.

Figure 5:
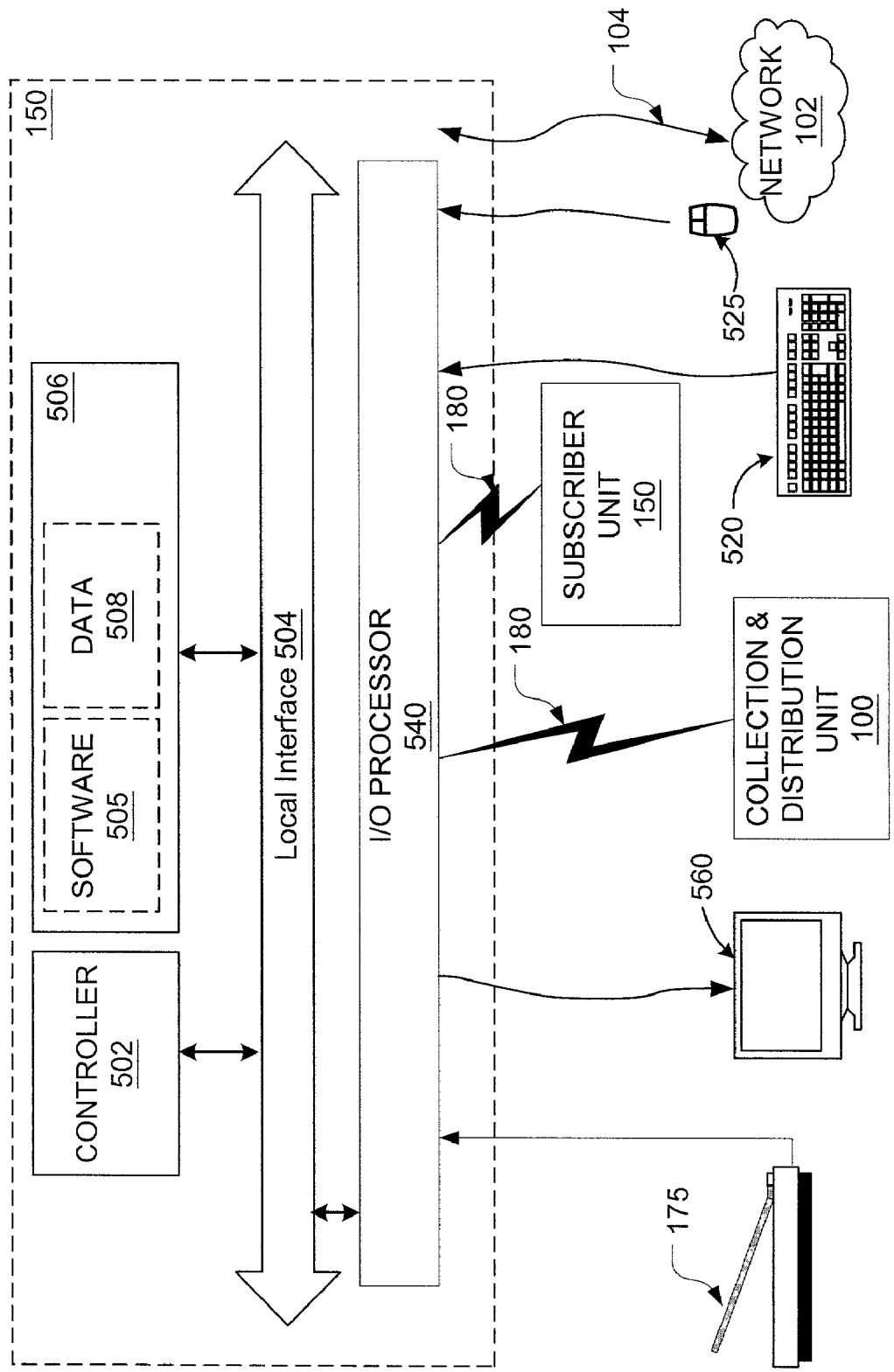
FIG. 5 is a block diagram of a subscriber unit 150.

FIG. 5 shows a detailed description of subscriber unit 150. Subscriber unit 150 includes a controller 502 and memory storage 506. Memory storage 506 may include memory for storing software 505 as well as data 508. Data 508 may include, among other things, calendar database 155 (FIG. 3). Software 505 may include operational software for causing the various functions and operations of subscriber unit 150 to be carried out. A local interface 504 is provided for transferring instructions and data between controller 502 and memory 506. Local interface 504 provides a conduit for transfer of electronic instructions and data from/to the input/output (I/O) processor 540. A subscriber interface 180 is provided for transferring data between a subscriber unit 150 and the subscriber unit 150. Further, I/O processor 540 includes provisions for receiving data from, for example, an optical imaging device 175 as well as keyboard 520 and pointing device 525. I/O processor 540 also includes an interface 104 for connecting the subscriber unit 150 to a network 102, as well as outputting image data for display on a display device 560. Display device 560 may be, for example, a cathode ray tube (CRT), liquid crystal display (LCD) or other type of display device. Further, display device 560 may be configured as a touch sensitive display/input device via which user input may be made. In this case, I/O processor 540 is configured to receive the input of the touch sensitive display device 560.

In one embodiment of subscriber unit 150, calendar database 155 is stored in memory storage associated with the subscriber unit 150. In another embodiment, calendar database 155 is stored on memory 506 of subscriber unit 150. The calendar database 155 is preferably stored in a format native to the subscriber unit 150.

Subscriber unit 150 may be configured to directly interface with, for example, an optical imaging device 175. Further, in one embodiment, subscriber unit 150 is configured to obtain calendar information directly from another subscriber unit 150 and to incorporate the obtained calendar information into the calendar database 155 associated with the subscriber unit 150.

Subscriber unit 150 may also be configured to carry out processing of the obtained calendar information. Processing of calendar information obtained from a calendar source 122 (FIG. 1) may include conversion of calendar data to format native to the calendar database 155 (native format) associated with a subscriber unit 150. It may also include conversion of obtained calendar data into an editable text format via, for example, optical character recognition (OCR).

In one embodiment, subscriber unit 150 is configured to exchange calendar data obtained from another subscriber unit 150, with the collection and distribution unit 100. Collection and distribution unit 100 may be configured to distribute all or part of this obtained calendar information to a registered subscriber unit 150 in accordance with preferences indicated on a subscriber record 410 (FIG. 4B) associated with the registered subscriber unit 150.

The system of the present invention provides for a subscriber unit 150 to be registered with the collection and distribution unit 100 for the collection of predetermined calendar data of interest from a predetermined calendar source 122. After calendar information of interest is obtained from a specified calendar source 122, it may be converted to place it into a desired format such as, for example, the native format of calendar database 155. The processed calendar data may then be distributed to the subscriber unit 150 via network 102 or subscriber interface 180.

Collection distribution unit 100 may be configured to retrieve calendar information of interest from a calendar source 122 that is specified by a subscriber record 410. The collection and distribution unit 100 may also be configured to receive an e-mail message from a sender identified on subscriber record 410 as a calendar source 122. For example, the e-mail message may be a text message from a source identified as a calendar source 413 in subscriber record 410 (FIG. 4B). In a further embodiment, collection distribution unit 100 may be configured to retrieve calendar data from a calendar source 122 specified by a subscriber record 410. Where the calendar source 122 provides, for example, calendar information posted in hyper-text mark-up language (html) format on a web site accessible via a network 102, the collection and distribution unit 100 may be configured to cause the html format calendar information to be downloaded. The downloaded html format calendar information may then be transferred, in html format, to the subscriber unit 150 via subscriber interface 180 or network 102, where it may then be incorporated into the calendar database stored on the subscriber unit 150.

Alternatively, where the subscriber unit 150 provides for storage of the calendar database 155 in a format other than the format of the calendar information retrieved from a specified calendar source 122, the collection data unit 100 may be configured to convert the obtained calendar information into a format compatible with the native format of the calendar database 155. This format conversion may be carried out by the collection and distribution unit 100 prior to transmitting the calendar data to the subscriber unit 150.

In a further embodiment, collection and distribution unit 100 may be configured to obtain the calendar database 155 from a subscriber unit 150 in the native data format of the calendar database 155. Calendar information obtained by the collection and distribution unit 100, from a specified calendar source 122, may be converted by the collection and distribution unit 100 into a format compatible with the calendar database 155 retrieved from the subscriber unit 150. The converted calendar information may then be imported, or otherwise incorporated into the calendar database 155 by the collection and distribution unit 100 to update the calendar database 155 so as to include the changes and information obtained from the specified calendar source 122. The updated calendar database 155 may then be transferred back to the subscriber unit 150 via, for example, network 102 or subscriber interface 180.

Alternatively, collection and distribution unit 100 may be configured to include storage memory for storing a calendar database 155 associated with a particular subscriber unit 150 or user. In this embodiment, when a user desires to review calendar or scheduling information via the subscriber unit 150, the subscriber unit 150 generates and sends a request to the collection and distribution unit 100 for the download of current calendar database information or relevant portions thereof. The collection and distribution unit 100 may then retrieve the requested information from the calendar database 155 and distribute it to the subscriber unit 150 via, for example, network 102 or subscriber interface 180. The user may then view/review the information retrieved from the calendar database 155 via the subscriber unit 150. The collection and distribution unit 100 may be configured to either download the calendar database 155, either in full or relevant part, to the subscriber unit 150 upon receiving a request for information from the calendar database 155. Any changes the user may make to the calendar database 155 via the subscriber unit 150 may be transmitted back to the collection and distribution unit 150 where such changes or new information may be incorporated into the database 155 stored in the storage memory associated with the collection and distribution unit 100.

Figure 6:
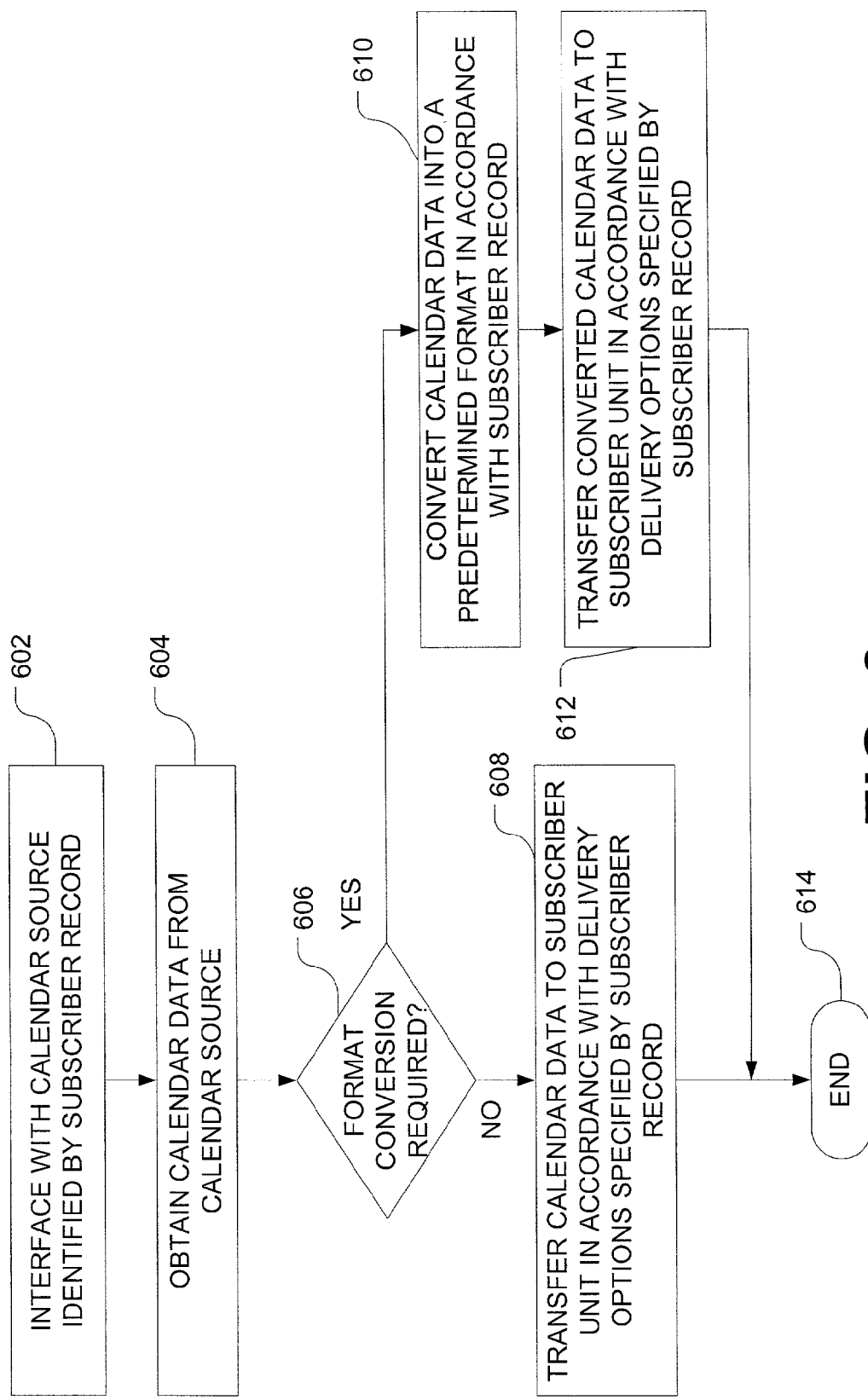
FIG. 6 is a flowchart illustrating a method of collecting and distributing calendar data.

FIG. 6 shows a flowchart illustrating a method of collecting and distributing calendar information. This flowchart shows that a calendar source is accessed or accessible (602). Calendar information is then obtained from the calendar source (604). If conversion of the obtained calendar information is required at 606, then the calendar data is converted into a predetermined format in accordance with preferences specified by a subscriber record (610). The converted calendar data is then distributed to a specified subscriber unit 150 (612). If no conversion of calendar data is required at 606, then the obtained calendar data is transferred to a specified subscriber unit in the data format that it was obtained (608). The process is then complete (614).

The collection and distribution unit 100 of the present invention can be implemented in hardware, software, firmware, or a combination thereof. In the preferred embodiment (s), the functional instructions for causing the collection and distribution unit 100 to carry out the various operations is implemented in software or firmware that is stored in a memory and that is executed by a suitable instruction execution system. If implemented in hardware, as in an alternative embodiment, the collection and distribution unit 100 can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc. Similarly, the subscriber unit 155 of the present invention can be implemented in hardware, software, firmware, or a combination thereof. In the preferred embodiment (s), the functional instructions for causing the subscriber unit 155 to carry out the various operations is implemented in software or firmware that is stored in a memory and that is executed by a suitable instruction execution system. If implemented in hardware, as in an alternative embodiment, the subscriber unit 155 can be implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

The flow chart of FIG. 6 shows the architecture, functionality, and operation of a possible implementation of software that causes the process of collection and distribution of calendar information to be carried out In this regard, each block represents a module, segment, or portion of code, which comprises one or more executable instructions for implementing the specified logical function(s). It should also be noted that in some alternative implementations, the functions noted in the blocks may occur out of the order noted in FIG. 6. For example, two blocks shown in succession in FIG. 6 may in fact be executed substantially concurrently or the blocks may sometimes be executed in the reverse order, depending upon the functionality involved, as will be further clarified hereinbelow.

The operational software programs that may be used by the collection and distribution unit 100, as well as the operational software that may be used by the subscriber unit 150, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

What is claimed:

1. A system for collecting calendar information from a predetermined calendar source and distributing calendar data to a subscriber, said system comprising:
    an input device configured to capture calendar data from a subscriber-designated calendar source;
    a collection and distribution unit communicatively coupled to the input device and a network via a network interface, the collection and distribution unit comprising a storage memory for storing a subscriber list and configured to integrate calendar data from the input device into a calendar database; and
    a subscriber unit indirectly coupled and registered with the collection and distribution unit, the subscriber unit configured to receive calendar data from the collection and distribution unit in accordance with said subscriber list;
    wherein the input device is operative to capture calendar data from the subscriber-designated calendar source responsive to identifying the subscriber-designated calendar source from the subscriber list such that the calendar data is captured without the calendar data being designated with the collection and distribution unit for distribution to the subscriber unit.

2. The system of claim 1, wherein said network comprises the Internet.

3. The system of claim 1, wherein said network interface comprises a wireless interface.

4. The system of claim 1, wherein said subscriber designated calendar source comprises a world wide web (WWW) site.

5. The system of claim 4, wherein said world wide web site comprises a hyper-text mark-up language (HTML) compliant web site.

6. The system of claim 1, wherein said collection and distribution unit collects data in a first format and distributes data in a native format of the calendar database.

7. The system of claim 1, wherein said subscriber unit stores the calendar database in a format other than the native format of the calendar database.

8. The system of claim 1, wherein:
    the system further comprises an optical imaging device configured to capture an image of calendar data; and
    the collection and distribution unit is operative to integrate calendar data from the image of calendar data for providing to the subscriber unit.

9. A system for collecting calendar information from a predetermined calendar source and distributing calendar data to a subscriber, said system comprising:
    an optical imaging device configured to capture an image of calendar data;
    a collection and distribution unit communicatively coupled to the optical imaging device and a network via a network interface, the collection and distribution unit comprising a storage memory for storing a subscriber list and configured to integrate calendar data from the image of calendar data into a native format of a calendar database; and
    a subscriber unit registered with the collection and distribution unit and configured to receive calendar data from the collection and distribution via said network interface in accordance with said subscriber list.

10. The system of claim 9, wherein said collection and distribution unit distributes said calendar data to the subscriber as an e-mail attachment.

11. The system of claim 9, wherein said subscriber list comprises data identifying the subscriber.

12. The system of claim 11, wherein said subscriber list further comprises data identifying said calendar data.

13. The system of claim 12, wherein said subscriber list further comprises data identifying a predetermined format for compiling said calendar data.

14. The system of claim 13, wherein said predetermined format is compliant with the Internet engineering task force standards for electronic business cards.

15. The system of claim 9, wherein said collection and distribution unit is further configured to synchronize calendar data.

16. The system of claim 9, wherein said optical imaging device comprises a camera.

17. The system of claim 9, wherein said collection and distribution unit collects data in a first format and distributes data in a native format of the calendar database.

18. The system of claim 9, wherein said subscriber unit stores the calendar database in a format other than the native format of the calendar database.

19. The system of claim 9, wherein said subscriber unit stores the calendar database in a format retrieved from a specified calendar source.

* * * * *

UNITED STATES PATENT AND TRADEMARK OFFICE
CERTIFICATE OF CORRECTION

PATENT NO.      : 7,035,913 B2                                    Page 1 of 1
APPLICATION NO. : 09/966281
DATED           : April 25, 2006
INVENTOR(S)     : Jerlyn R Culp et al.

It is certified that error appears in the above-identified patent and that said Letters Patent is hereby corrected as shown below:

In column 10, line 28, in Claim 9, after "database;" delete "and".

In column 10, line 32, in Claim 9, after "list" delete "." and insert -- ; and an input device operative to capture calendar data from a subscriber-designated calendar source of the subscriber list responsive to identifying the subscriber-designated calendar source from the subscriber list such that the calendar data is captured without the calendar data being designated with the collection and distribution unit for distribution to the subscriber unit. --, therefor.

Signed and Sealed this

Thirteenth Day of May, 2008

JON W. DUDAS
*Director of the United States Patent and Trademark Office*